Oct. 12, 1926.  
P. L. HOWE  
1,603,111  
COMBINED COOKING AND HEATING STOVE  
Filed June 21, 1926  
2 Sheets-Sheet 1
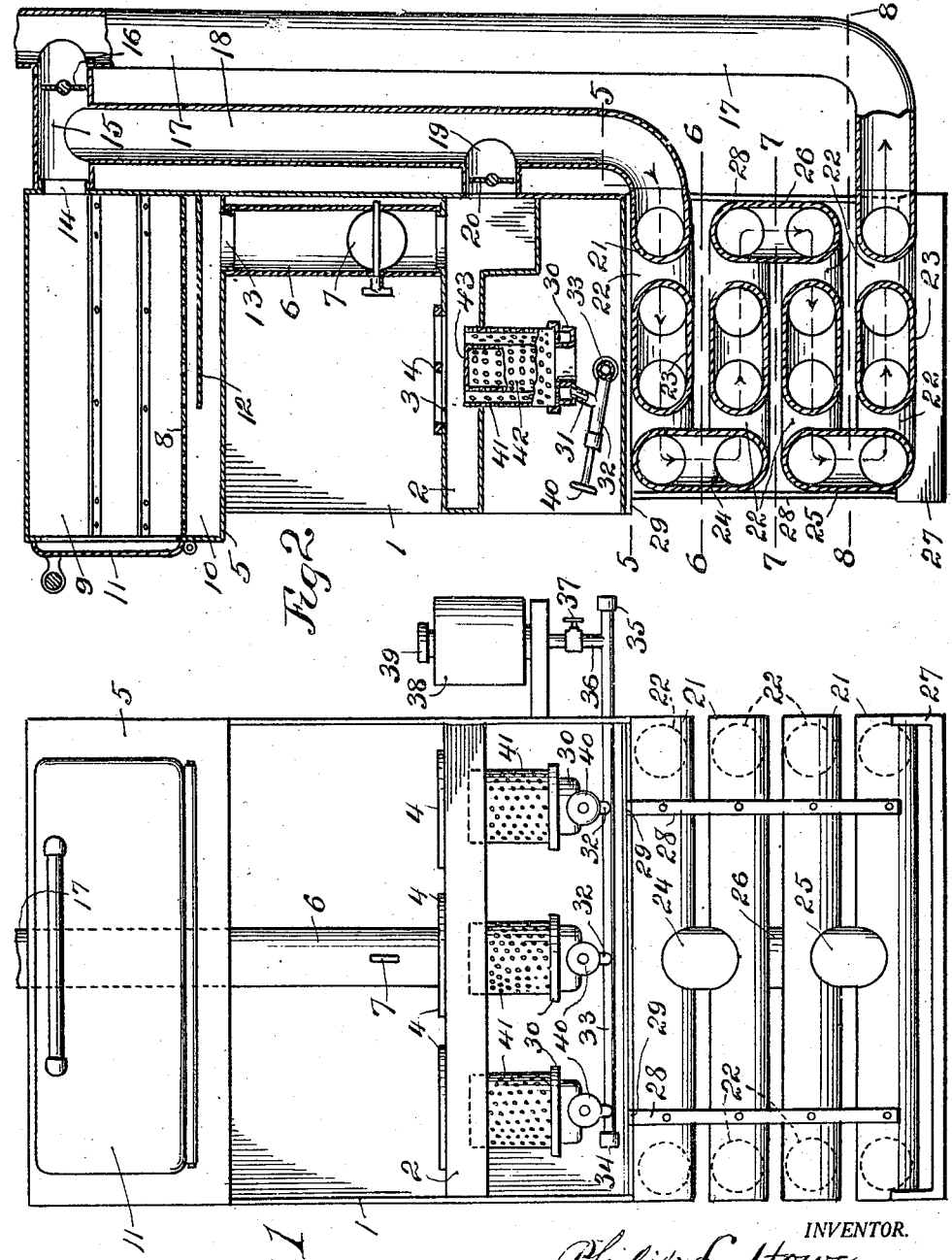
INVENTOR.  
Philip L. Howe  
BY  
Warren D. House,  
His ATTORNEY.
Witness:  
R. E. Hamilton Oct. 12, 1926. 1,603,111
P. L. HOWE
COMBINED COOKING AND HEATING STOVE
Filed June 21, 1926  2 Sheets-Sheet 2
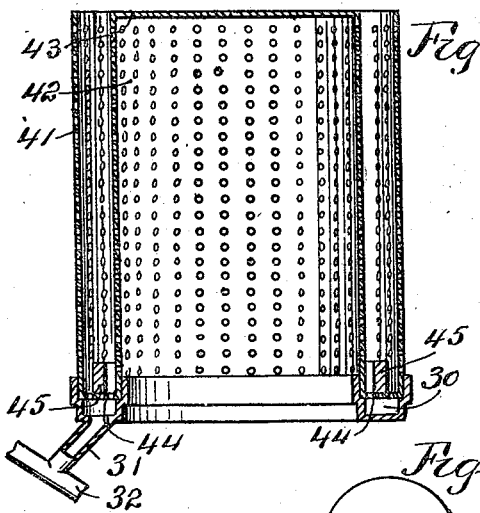
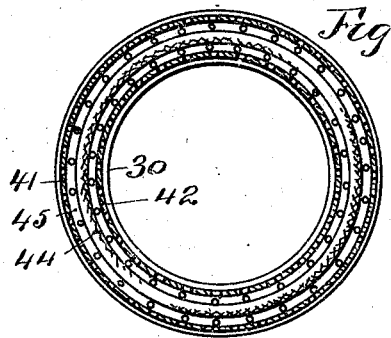
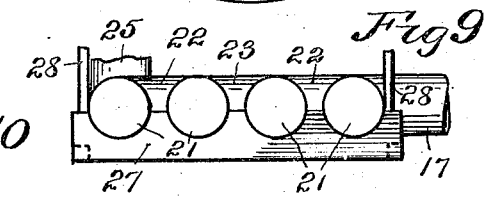
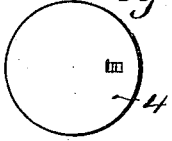
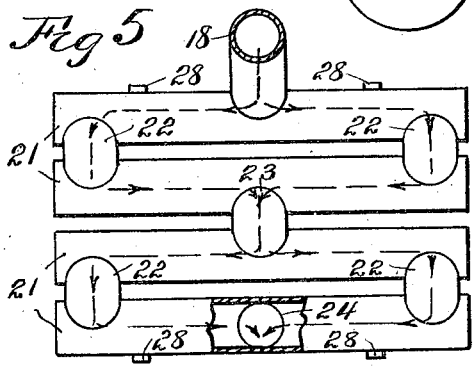
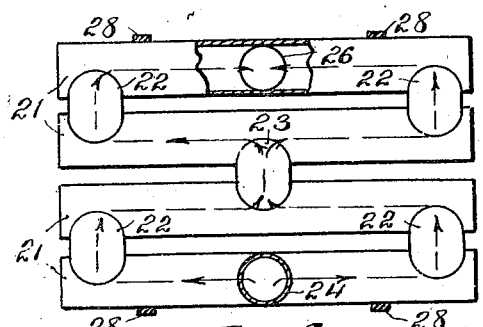
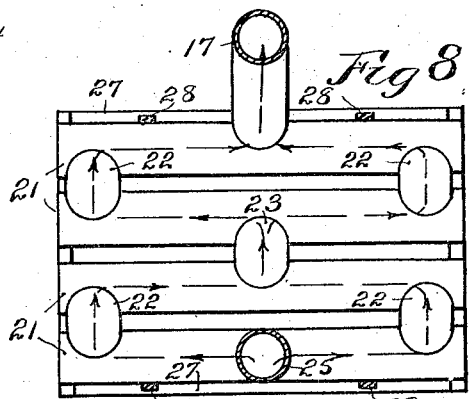
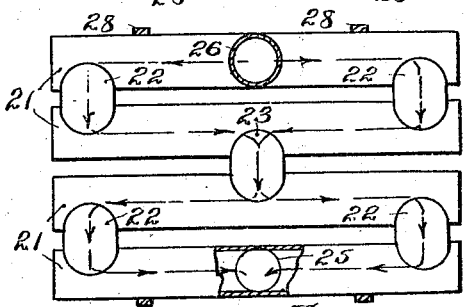
INVENTOR.
Philip L. Howe.
BY
Warren L. House
His ATTORNEY.
Witness:
R. E. Hamilton Patented Oct. 12, 1926.

1,603,111

UNITED STATES PATENT OFFICE.

PHILIP L. HOWE, OF WILSON, TEXAS.

COMBINED COOKING AND HEATING STOVE.

Application filed June 21, 1926. Serial No. 117,238.

My invention relates to improvements in combined cooking and heating stoves. It is particularly well adapted for use in connection with stoves which use oil or gas for fuel.

One of the objects of my invention is to provide a stove of the kind described, which is relatively simple and cheap to construct, which is durable and not liable to get out of order, which is economical in fuel consumption, which may be used for cooking or heating alone, or which may be used simultaneously for both cooking and heating, which is easy to operate and simple in operation, and which discharges the gaseous products of combustion from the room containing the stove.

A further object of my invention is the provision of a novel oven.

Still another object of my invention is the provision of a novel radiator adapted to be used for heating purposes in connection with the cooking portion of the stove, and which secures economical fuel consumption, when the stove is used either for cooking or heating, or both.

My invention also provides a novel burner adapted for gas or oil and for use in connection with my improved stove.

The novel features of my invention are hereinafter fully described and claimed.

In the accompanying drawings which illustrate the preferred embodiment of my invention, Fig. 1 is a front elevation of my improved stove.

Fig. 2 is a central vertical sectional view of the same.

Fig. 3 is an enlarged vertical central sectional view of one of my improved burners.

Fig. 4 is a cross section on the line 4—4 of Fig. 3.

Fig. 5 is a horizontal section, partly broken away, on the line 5—5 of Fig. 2.

Fig. 6 is a horizontal section, partly broken away, on the line 6—6 of Fig. 2.

Fig. 7 is a horizontal section, partly broken away, on the line 7—7 of Fig. 2.

Fig. 8 is a horizontal section, partly broken away, on the line 8—8 of Fig. 2.

Fig. 9 is a side elevation of the lowermost section of the radiator and the support therefor.

Fig. 10 is a plan view of an imperforate lid adapted for use on the stove part in lieu of the grid shown in Fig. 2.

Similar reference characters designate similar parts in the different views.

1 designates the stove body of the type usually employed for cooking ranges, and having a combustion chamber 2, provided with the usual top openings 3 over which are adapted to be disposed the usual lids or grids 4.

The body of the stove has above the combustion chamber 2 and spaced therefrom, an oven 5, into the bottom of which discharges a pipe 6, the lower end of which communicates with the combustion chamber 2, and in which is a damper 7.

In the oven 5 is a transverse perforate partition 8, Fig. 2, which divides the oven into an upper chamber 9 and a lower chamber 10. The upper chamber 9 is a baking chamber and has the usual front door 11. In the lower chamber 10 extending from side to side thereof and from the rear side is a transverse baffle plate 12, the front edge of which is spaced from the front wall of the chamber 10, and which is spaced from the partition 8 and is above and spaced from the opening 13 in the bottom of the oven into which the pipe 6 discharges.

The rear side of the chamber 9 has an opening 14 which discharges into a rearwardly extending oven discharge pipe 15, which has in it a damper 16 and which discharges into a main discharge pipe 17.

Auxiliary means for discharging the gaseous products of combustion from the combustion chamber 2 are provided, and comprises an auxiliary discharge pipe 18 into which discharges a combustion chamber discharge pipe 19 connected with the rear side of the combustion chamber and having in it a damper 20.

The upper end of the pipe 18 is connected to the pipe 15 intermediately of the damper 16 and the oven 5, Fig. 2.

The stove body 1 is above and supported on my improved radiator, which comprises, preferably, the following described parts.

A plurality of horizontal transverse tubes 21 are disposed in pairs, the end portions of the tubes of each pair being connected by longitudinal horizontal tubes 22.

The pairs of tubes are arranged in a plurality of horizontal sections disposed one above the other.

The adjacent tubes 21 of adjacent pairs in the different sections are centrally connected by horizontal longitudinal tubes 23.

In the drawings, four sections are shown, and the front tubes of the two upper sections are centrally connected by a vertical tube 24, the two lower sections also being connected by a vertical tube 25 connected to the front tubes 21 of said lower sections at the centers of said tubes. A vertical tube 26 centrally connects the two rear tubes 21 of the two intermediate sections.

The main discharge pipe 17 is centrally connected to the rear tube 21 of the lowermost section, and the auxiliary pipe 18 is centrally connected to the rear tube 21 of the top section.

The radiator rests on a base 27, the upper edges of the sides of which have arcuate recesses in which rest the end portions of the tubes 21 of the lowermost section.

Vertical brace bars 28 are fastened to the front tubes of the four sections, and similar bars are similarly attached to the rear tubes 21 of the different sections.

Horizontal brace bars 29 are fastened to the sections 21 of the uppermost section, and upon these bars rests the stove body 1.

Any suitable gas or oil burners may be used with the stove. To prevent the accumulation in the pipes of soot, the burners used should burn gas or oil with a blue flame.

In the drawings I have shown three burners of my invention, which are adapted to burn gas or oil with blue flames, and each of which comprises a channel base 30, Figs. 3 and 4 provided with a fuel supply pipe 31. The three fuel supply pipes 31 are respectively connected to three branches 32 of a horizontal fuel supply pipe 33, on the ends of which are respectively fitted removable caps 34 and 35. For use with gas, the cap 35 is removed and the pipe 33 is attached at that end to a gas supply pipe, not shown. For use with oil, the pipe 33 has a vertical branch 36 having a shut off valve 37 and connected at its upper end with an oil tank 38 provided with the usual top closure 39.

In the branches 32 are respectively mounted three needle valves 40.

In each ring channel base 30, and fitted to the inner side of the outer wall of the channel is a vertical perforated tube 41. The tubes 41 extend respectively through holes provided therefor in the bottom of the combustion chamber 2.

In each channel base ring 30 is also fitted to the outer side of the inner wall of the channel a vertical perforated tube 42 of the height of the adjacent tube 41 and having its upper end closed by a circular horizontal plate 43.

Supported in and by the base ring 30 between the tubes 41 and 42 is a perforated ring 44, upon which is adapted to rest an asbestos wick ring 45, when oil is being burned, but which may be removed, if gas is to be burned. The ring serves to diffuse the gas that is fed into the channel base 30, when gas is used.

In the positions of the dampers 7, 16 and 20, shown in Fig. 2, the stove is adapted for both baking and heating simultaneously. In such position of the dampers, the gaseous products of combustion will travel from the combustion chamber 2 through the pipe 6 into the chamber 10 of the oven 5, thence around and over the baffle plate 12 and through the partition 8 into the chamber 9, which is the baking chamber, thence through the pipes 15 and 18 into the center of the rear tube 21 of the top radiator section. Thence the gas divides and passes from the ends of the tube through the side tubes 22 into the next tube 21, thence to the center of this tube and out through the adjacent central tube 23 to the tube 21 next in front, thence to the ends of this tube and through the next side tubes 22 into the front tube 21 of the top section. The gas then travels to the center of this front tube to the front vertical tube 24, thence downwardly into the center of the front tube 21 of the next lower section. The gas then passes in a similar manner through the second section to the rear tube 21 of such section, thence downwardly through the central vertical tube 26 into the third section from the top, thence forwardly through this section by dividing and uniting, as above described to the front tube of the third section, thence downwardly through the central tube 25 into the center of the front tube 21 of the lowermost section, and thence through this section to and out of the central part of the rear tube 21 of the lowermost section into the main discharge pipe 17 by which the gas is discharged into the flue, not shown.

The air for combustion which enters at the front of the stove under the combustion chamber 2, passes through and is retarded by the perforated tubes 41 and 42, thus mingling and being burned with the vapor from the ignited oil. The burnt gaseous products are also retarded in their passage to the pipe 17 by the sinuous course taken through the oven, pipes 15, 18 and radiator tubes, so that by the time that they reach the pipe 17, the heat has been mostly absorbed or radiated, thereby effecting such heating and cooking as is desired with a minimum of fuel.

If it is desired not to bake in the oven 5, the damper 7 is closed, and the damper 20 is opened. If it is desired not to heat with the radiator, the damper 16 is opened, thus permitting the gaseous products to pass directly from the combustion chamber 2 through the pipes 19, 18 and 15 to the main discharge pipe 17.

I do not limit my invention to the structure shown and described, as many modifications, within the scope of the appended claims, may be made without departing from the spirit of my invention.

What I claim is:—

1. In a combined cooking and heating stove, the combination with a cooking stove body having a combustion chamber, an oven, a pipe connecting said combustion chamber with said oven, and a damper in said pipe, of a radiator having an inlet and an outlet for gaseous products of combustion, a main discharge pipe connected with said outlet, an oven discharge pipe connecting said oven with said main discharge pipe, a damper in said oven discharge pipe, an auxiliary discharge pipe connected with said inlet and connected with said oven discharge pipe intermediate of said oven and said damper in said oven discharge pipe, a combustion chamber discharge pipe connecting said combustion chamber with said auxiliary discharge pipe, and a damper in said combustion chamber discharge pipe.

2. In a combined cooking and heating stove, the combination with a cooking stove body having a combustion chamber, of a radiator having an inlet and an outlet for gaseous products of combustion, a main discharge pipe connected with said outlet, auxiliary discharge means connected with said inlet and with said main discharge pipe, a damper in said auxiliary discharge means, a combustion chamber discharge pipe connected with said combustion chamber and connected with said auxiliary discharge means intermediate of said inlet and said main discharge pipe, and a damper in said combustion chamber discharge pipe.

3. In a combined cooking and heating stove, a stove body having a combustion chamber, an oven above said chamber, a pipe connecting said combustion chamber with said oven, and a damper in said pipe, a radiator below said combustion chamber and having an inlet and an outlet for gaseous products of combustion, a main discharge pipe connected with said outlet, an oven discharge pipe connecting said oven with said main discharge pipe, a damper in said oven discharge pipe, an auxiliary discharge pipe connected with said inlet and connected with said oven discharge pipe intermediate of the damper therein and said oven, a combustion chamber discharge pipe connecting said combustion chamber with said auxiliary pipe intermediate of said inlet and said oven discharge pipe, and a damper in said combustion chamber discharge pipe.

4. In a combined cooking and heating stove, the combination with a radiator having an inlet for gaseous products of combustion and an outlet disposed lower than said inlet, of a stove body above and supported by said radiator and having a combustion chamber, an oven above said combustion chamber, a discharge pipe connecting said combustion chamber and said oven, and a damper in said pipe, a main discharge pipe connected with said outlet, an oven discharge pipe connecting with said oven and said main discharge pipe, a damper in said oven discharge pipe, an auxiliary discharge pipe connecting with said inlet and connected to said oven discharge pipe intermediate of the damper therein and said oven, a combustion chamber discharge pipe connecting said combustion chamber with said auxiliary discharge pipe, and a damper in said last named combustion chamber discharge pipe.

5. In a stove of the kind described, the combination with a combustion chamber, of a radiator below said combustion chamber comprising a plurality of horizontal parallel tubes arranged in pairs, tubes connecting the end portions of each pair, tubes centrally connecting the adjacent tubes of adjacent pairs, a main discharge pipe centrally connected to the last tube of the last pair, and an auxiliary discharge means connected with said combustion chamber and centrally connected with the first tube of the first pair.

6. In a stove of the kind described, the combination with a combustion chamber, of a radiator below said combustion chamber comprising a plurality of horizontal parallel tubes arranged in pairs, tubes connecting the end portions of each pair, tubes centrally connecting the adjacent tubes of adjacent pairs, said pairs of tubes being disposed in horizontal sections one above the other, a main discharge pipe centrally connected to the last tube of the last pair in the lowermost section, and auxiliary discharge means connected with said combustion chamber and centrally connected with the first tube of the first pair in the uppermost section.

In testimony whereof I have signed my name to this specification.

PHILIP L. HOWE.